United States Patent
Fuji et al.

(10) Patent No.: US 9,690,532 B2
(45) Date of Patent: Jun. 27, 2017

(54) MOBILE ELECTRONIC DEVICE AND CHARACTER INPUT METHOD

(75) Inventors: Masateru Fuji, Kanagawa (JP); Hiroyuki Bamba, Kanagawa (JP)

(73) Assignee: KYOCERA CORPORATION, Kyoto (JP)

(*) Notice: Subject to any disclaimer, the term of this patent is extended or adjusted under 35 U.S.C. 154(b) by 88 days.

(21) Appl. No.: 13/481,304

(22) Filed: May 25, 2012

(65) Prior Publication Data
US 2012/0299953 A1    Nov. 29, 2012

(30) Foreign Application Priority Data

May 27, 2011  (JP) ................................ 2011-119738
May 25, 2012  (JP) ................................ 2012-120211

(51) Int. Cl.
*G06F 3/14*   (2006.01)
*G06F 1/16*   (2006.01)
(Continued)

(52) U.S. Cl.
CPC .......... *G06F 3/1423* (2013.01); *G06F 1/1616* (2013.01); *G06F 1/1622* (2013.01);
(Continued)

(58) Field of Classification Search
CPC ........ G06F 3/023; G06F 3/1423; G06F 3/048; G06F 3/01; G09G 2340/0492; G09G 5/14;
(Continued)

(56) References Cited

U.S. PATENT DOCUMENTS 5,467,392 A * 11/1995 Norimatsu ...... H04M 1/274558
                                                      379/354
6,243,645 B1 *  6/2001 Moteki ................. G01C 21/26
                                                      340/988
(Continued)

FOREIGN PATENT DOCUMENTS

JP    2007-200243 A    8/2007
JP    2009-32209 A     2/2009
(Continued)

OTHER PUBLICATIONS

Office Action issued to U.S. Appl. No. 13/481,304, mailed Feb. 14, 2014.
(Continued)

*Primary Examiner* — Jacinta M Crawford
*Assistant Examiner* — Jitesh Patel
(74) *Attorney, Agent, or Firm* — Hauptman Ham, LLP

(57) ABSTRACT

An object is to provide a mobile electronic device and a character input method which can shorten a view point movement distance of a user even in a state where the display screen of the display unit is used horizontally. The control unit displays the first character kind character left aligned on an upper side of the display screen, and displays the second character kind character right aligned on a lower side of the display screen. When a predetermined operation is performed with the operation unit, the control unit maintains the display of either one of the first character kind character and the second character kind character on the display screen according to the operated action while maintaining the display position, and deletes the display of the other one of the first character kind character and the second character kind character.

13 Claims, 14 Drawing Sheets

(51) Int. Cl.
*G06F 3/023* (2006.01)
*H04M 1/725* (2006.01)
*G09G 5/14* (2006.01)
*H04M 1/02* (2006.01)

(52) U.S. Cl.
CPC ........ *G06F 3/0237* (2013.01); *H04M 1/0241* (2013.01); *H04M 1/72519* (2013.01); *G09G 5/14* (2013.01); *G09G 2340/0492* (2013.01); *G09G 2370/24* (2013.01); *H04M 1/021* (2013.01)

(58) Field of Classification Search
CPC . H04M 1/021; H04M 1/0241; H04M 1/72519
USPC .................................................. 715/761, 768
See application file for complete search history.

(56) References Cited

U.S. PATENT DOCUMENTS

| | | | |
|---|---|---|---|
| 6,564,213 B1* | 5/2003 | Ortega et al. | |
| 6,868,145 B1* | 3/2005 | Nelson | G06F 3/0219 379/93.05 |
| 8,560,959 B2* | 10/2013 | Zaman | G06F 3/048 715/234 |
| 8,723,802 B2 | 5/2014 | Watanabe et al. | |
| 2003/0203747 A1* | 10/2003 | Nagamine | 455/575.3 |
| 2004/0021681 A1* | 2/2004 | Liao | G06F 1/1616 715/702 |
| 2005/0129199 A1* | 6/2005 | Abe | 379/90.01 |
| 2006/0005146 A1* | 1/2006 | Arcas | G06F 3/0481 715/802 |
| 2006/0129949 A1* | 6/2006 | Wu | 715/804 |
| 2007/0189717 A1* | 8/2007 | Yun et al. | 386/95 |
| 2007/0287479 A1* | 12/2007 | Kim | 455/466 |
| 2008/0172609 A1* | 7/2008 | Rytivaara | G06F 9/45512 715/700 |
| 2008/0174564 A1* | 7/2008 | Kim et al. | 345/173 |
| 2008/0288241 A1* | 11/2008 | Noda | G06F 17/2836 704/4 |
| 2008/0313048 A1* | 12/2008 | Killian | G06Q 20/20 705/17 |
| 2009/0125807 A1* | 5/2009 | Chen | G06F 3/018 715/261 |
| 2009/0276788 A1* | 11/2009 | Homma | H04N 19/159 718/107 |
| 2009/0288036 A1* | 11/2009 | Osawa et al. | 715/794 |
| 2009/0293007 A1* | 11/2009 | Duarte | G06F 3/0481 715/767 |
| 2010/0035658 A1* | 2/2010 | Lee | 455/566 |
| 2010/0066751 A1 | 3/2010 | Ryu et al. | |
| 2010/0081475 A1* | 4/2010 | Chiang et al. | 455/564 |
| 2010/0214278 A1* | 8/2010 | Miura | G06F 1/3203 345/212 |
| 2010/0223547 A1* | 9/2010 | Wilson et al. | 715/261 |
| 2010/0248788 A1* | 9/2010 | Yook | G06F 3/0481 455/566 |
| 2010/0304791 A1 | 12/2010 | Lee et al. | |
| 2011/0124376 A1* | 5/2011 | Kim | G06F 1/1626 455/566 |
| 2011/0175818 A1 | 7/2011 | Watanabe et al. | |

FOREIGN PATENT DOCUMENTS

| | | | | |
|---|---|---|---|---|
| JP | 2010-33429 A | | 2/2010 | |
| KR | EP 1892863 A2 * | | 2/2008 | ............ H04H 40/18 |
| WO | 2009/017175 A1 | | 2/2009 | |
| WO | 2010/110613 A1 | | 9/2010 | |

OTHER PUBLICATIONS

Office Action mailed Feb. 20, 2014, corresponding to U.S. Appl. No. 13/481,409.
Office Action mailed Sep. 30, 2014, corresponding to U.S. Appl. No. 13/481,409.
Office Action mailed Sep. 29, 2015, corresponding to Japanese Patent Application No. 2012-120211, for which an explanation of relevance is attached.

* cited by examiner (a)

| KEY POSITION INFORMATION | KEY ASSIGNING |
|---|---|
| ⋮ | ⋮ |
| X2, Y1 | 1 |
| X2, Y2 | 2 |
| X2, Y3 | 3 |
| X3, Y1 | 4 |
| X3, Y2 | 5 |
| X3, Y3 | 6 |
| ⋮ | ⋮ |

(b)

| KEY POSITION INFORMATION | NUMBER OF TIMES CONTINUOUSLY PRESSED | KEY ASSIGNING |
|---|---|---|
| ⋮ | | ⋮ |
| X2, Y2 | 1 | a |
| | 2 | b |
| | 3 | c |
| | 4 | A |
| | 5 | B |
| | | ⋮ |

(c)

| KEY POSITION INFORMATION | KEY ASSIGNING |
|---|---|
| ⋮ | ⋮ |
| X2, Y1 | 1ch |
| X2, Y2 | 2ch |
| X2, Y3 | 3ch |
| X3, Y1 | 4ch |
| X3, Y2 | 5ch |
| X3, Y3 | 6ch |
| ⋮ | ⋮ |

(d)

MOBILE ELECTRONIC DEVICE AND CHARACTER INPUT METHOD

This application is based on and claims the benefit of priority from Japanese Patent Application Nos. 2011-119738 and 2012-120211, respectively filed on 27 May 2011 and filed on 25 May 2012, the content of which is incorporated herein by reference.

BACKGROUND OF THE INVENTION

Field of the Invention

The present invention relates to a mobile electronic device having a display unit, and a character input method thereof.

Related Art

In a conventional electronic device having a display unit and an operation unit, when an operation unit is operated in a state where a standby screen is displayed on the display unit, characters of different character kinds assigned to the operation unit are input into the electronic device and displayed in different regions in the display unit. Moreover, the electronic device launches a selected application in a state where the displayed characters are inputted by selecting a desired application from a menu for a plurality of applications in a state where inputted characters are displayed on the display unit (for example, refer to JP2007-200243A and JP2009-032209A).

SUMMARY OF THE INVENTION

However, in the electronic devices described in JP2007-200243A and JP2009-032209A, in many cases, characters of different character kinds are displayed in the display screen of the display unit by splitting the display screen into two upper and lower sides in both the state where the display screen of the display unit is used vertically and the state where the display screen is used horizontally. Therefore, in the state where the display screen of the display unit is used horizontally, the view point movement distance of the user is long when the user views both character strings of different character kinds, thus spoiling the operability.

An object of the present invention is to provide a mobile electronic device and a character input method, which can shorten a view point movement distance of the user even in a state where the display screen of the display unit is used horizontally.

In order to solve the above problems, the mobile electronic device according to the present invention includes: a display unit having a display screen of a substantially rectangular shape; an operation unit having a plurality of operation keys to which at least a first character kind character and a second character kind character are assigned; and a control unit which, when one operation key is operated among the plurality of operation keys, displays the first character kind character and the second character kind character assigned to the operated operation key on the display screen; in which in a state where the display screen is used horizontally, the control unit displays the first character kind character left aligned on an upper side of the display screen and displays the second character kind character right aligned on a lower side of the display screen; and when a predetermined operation is performed with the operation unit, the control unit continues the display of either one of the first character kind character and the second character kind character on the display screen while maintaining the display position and deletes the display of the other one of the first character kind character and the second character kind character.

In addition, it is preferable if, when an operation that adopts the display of the second character kind character is performed as the predetermined operation, the control unit deletes the display of the first character kind character and displays the display relating to the second character kind character right aligned while maintaining the display position of the second character kind character on the display screen.

In addition, it is preferable if, when an operation to display the second character kind character is performed with the operation unit, the control unit displays a single color display in an entire display region where the first character kind character is displayed while maintaining the display position of the second character kind character on the display screen.

In addition, it is preferable if, when an operation that adopts the display of the first character kind character is performed as the predetermined operation with the operation unit, the control unit deletes the display of the second character kind character and displays the display relating to the first character kind character on the entire width display screen while maintaining the display position of the second character kind character on the display screen.

In addition, it is preferable if the control unit splits the display screen into right and left sides, and displays the first character kind character left aligned on an upper part of the split left side display screen, and displays the second character kind character right aligned on a lower part of the split right side display screen.

In addition, it is preferable if the control unit splits the display screen into upper and lower sides, and displays the first character kind character left aligned on an upper part of the split upper side display screen, and displays the second character kind character right aligned on a lower part of the split lower side display screen.

In addition, it is preferable if the operation unit includes a call making key for making a call, and when the call making key is operated as the predetermined operation, the control unit deletes the display of the first character kind character while maintaining the display position of the second character kind character in the display screen.

In addition, it is preferable if, after the display of the other one of the first character kind character and the second character kind character is deleted while maintaining the display position of one of the first character kind character and the second character kind character on the display screen, when an operation to delete a part of the maintained character string of the first character kind character or the second character kind character is performed with the operation unit, the control unit returns the state to a state where both the first character kind character and the second character kind character are displayed on the display screen.

In order to solve the above problems, the character input method in a mobile electronic device including a display unit having a display screen of a substantially rectangular shape, and an operation unit, according to the present invention includes: a step of displaying, when one operation key is operated among a plurality of operation keys of the operation unit, a first character kind character and a second character kind character assigned to the operated operation key on a display screen of the display unit; a step of displaying, in a state where the display screen is used horizontally and both the first character kind character and the second character kind are displayed on the display screen, the first character kind character left aligned on an upper side of the display screen, and the second character kind character right aligned on a lower side of the display screen; and a step of continuing, when a predetermined operation is performed with the operation unit, the display of one of the first character kind character and the second character kind character on the display screen performed while maintaining the display position, and deleting the display of the other one of the first character kind character and the second character kind character.

In accordance with the present invention, there are provided a mobile electronic device and a character input method which can shorten a view point movement distance of the user even in a state where the display screen of the display unit is used horizontally.

DETAILED DESCRIPTION OF THE INVENTION

Figure 1:
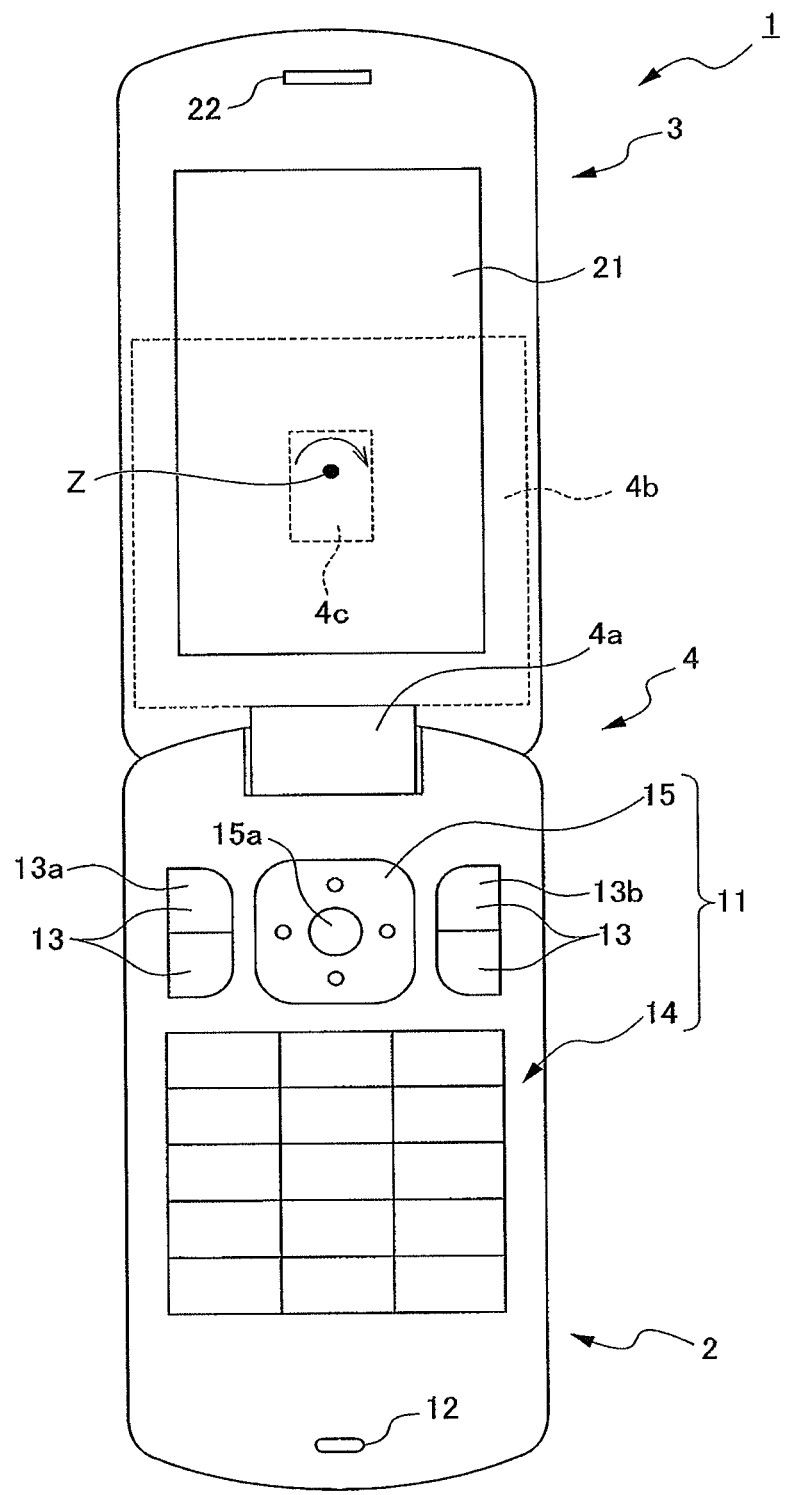
FIG. 1 is a front view of the cellular telephone device in an open state.
Figure 2:
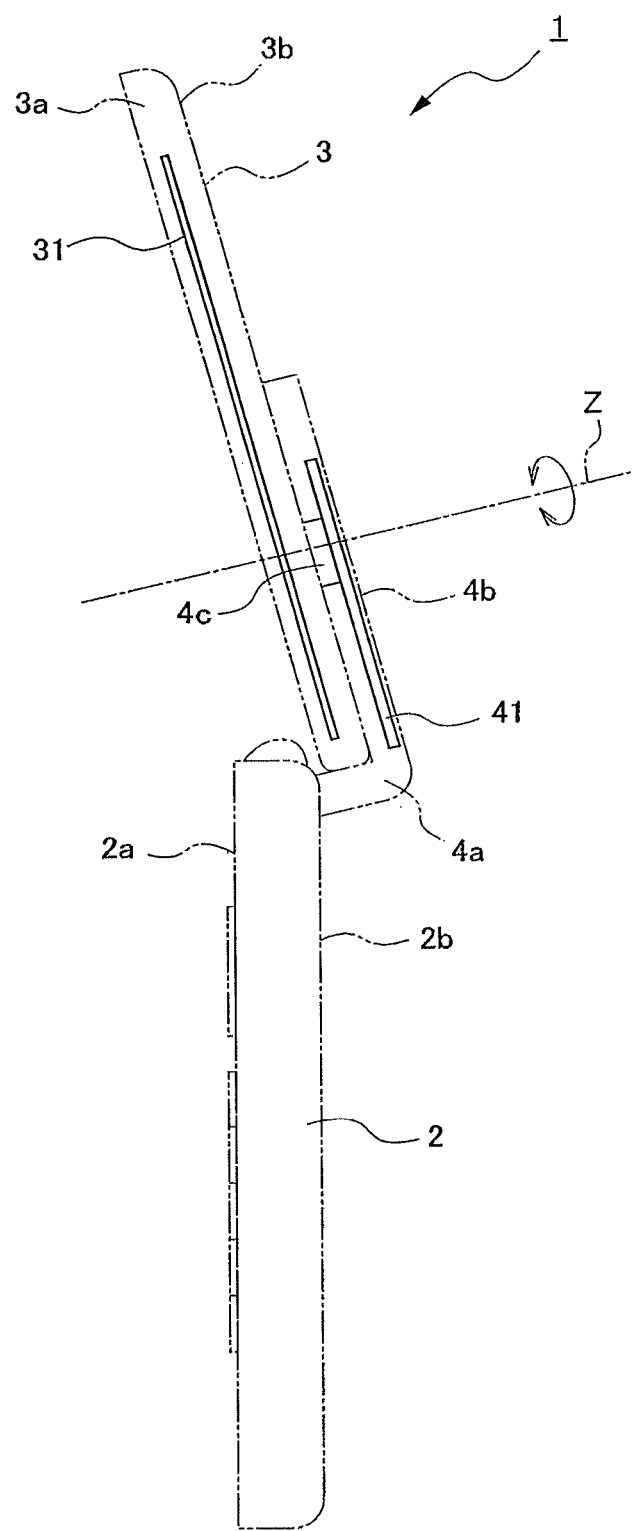
FIG. 2 is a side view of the cellular telephone device in an open state.
Figure 3:
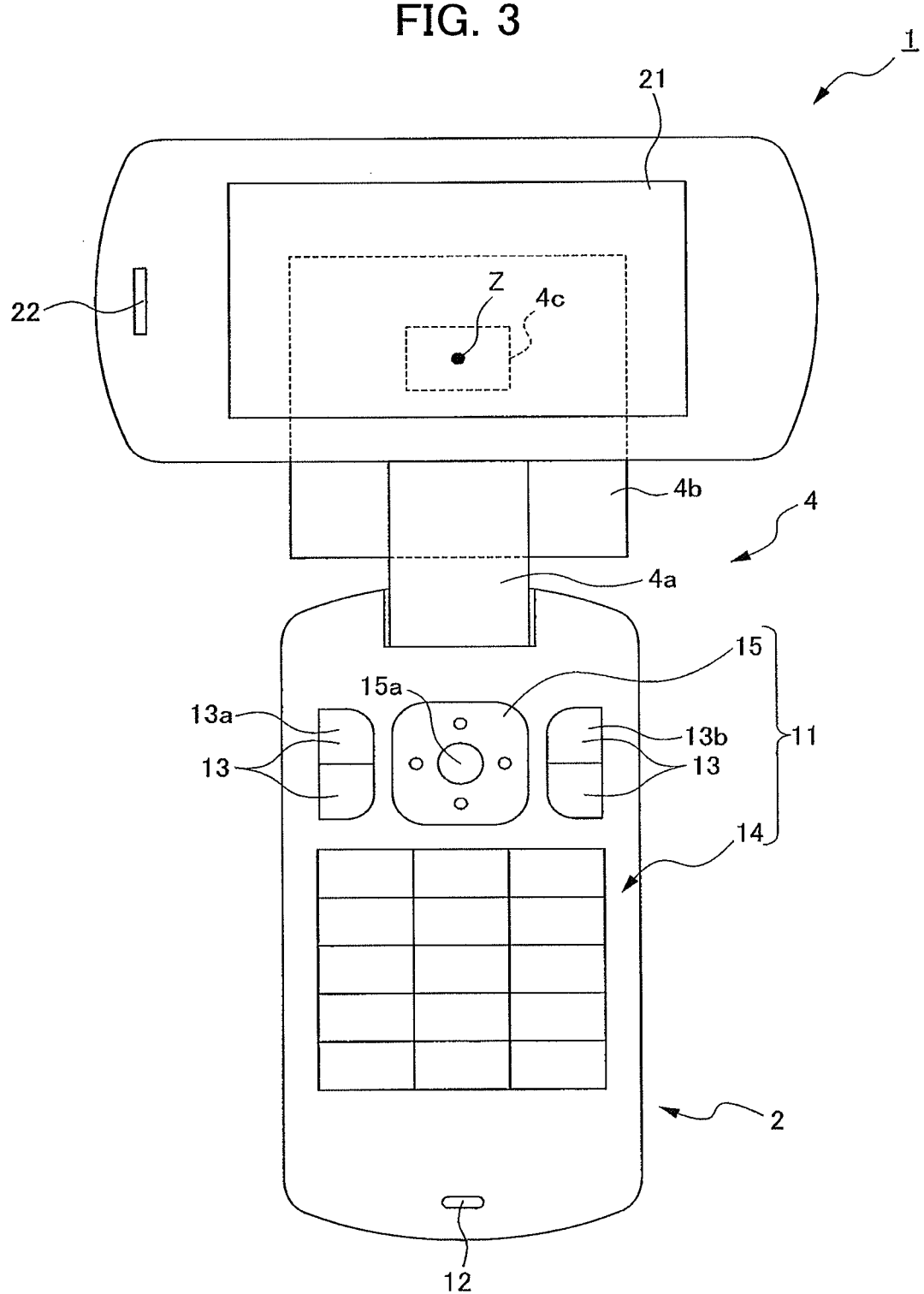
FIG. 3 is a front view of the cellular telephone device in a cross state.

Hereafter, the embodiment of the present invention will be described with reference to the drawings. Basic structures in a cellular telephone device 1 that serves as a mobile electronic device will be described with reference to FIGS. 1 to 3. FIG. 1 is a front view of the cellular telephone device 1 in an open state. FIG. 2 is a side view of the cellular telephone device 1 in an open state. FIG. 3 is a front view of the cellular telephone device 1 in a cross state.

As shown in FIGS. 1 to 3, the cellular telephone device 1 of this embodiment comprises: an operation unit side case 2 that serves as a first case; and a display unit side case 3 that serves as a second case.

External surface of the operation unit side case 2 is constituted by a front case 2a and a rear case 2b. The operation unit side case 2 is configured so that an operation unit 11, and a microphone 12 to which voice of the user of the cellular telephone device 1 is inputted are exposed to the front case 2a side.

The operation unit 11 comprises: a function setting operation key 13 for actuating various functions such as various settings, a directory function, and an e-mail function; an input operation key 14 for inputting, for example, numeric characters of a telephone number and characters of e-mails or the like; and a determination operation key 15, that serves as an operating member, which performs operations such as determination in various operations, and scrolling in up, down, right-left directions. A predetermined function is assigned to each of the keys which constitute the operation unit 11 according to the opening and closing state of the operation unit side case 2 and the display unit side case 3, various modes, or kinds of the launched application or the like (key assigning). Moreover, by the user pressing a respective key, an action according to a function assigned to the key is executed.

The external surface of the display unit side case 3 is constituted by a front case 3a and a rear case 3b. On the front case 3a of the display unit side case 3, a display unit 21 for displaying a variety of information and a speaker 22 which outputs voice of the other party of a telephone call are arranged so as to be exposed to the outside. Here, the display unit 21 is constituted by components such as: a liquid crystal panel; a drive circuit for driving the liquid crystal panel; and a light source unit such as a back light unit, which irradiates light from the back side of the liquid crystal panel.

The operation unit side case 2 and the display unit side case 3 are connected openably and closably via an connecting part 4. Specifically, the connecting part 4 is constituted by: a hinge mechanism 4a; a supporting part 4b; and a rotation mechanism 4c.

As shown in FIG. 2, the end part of the operation unit side case 2 at the connecting part 4 side and the supporting part 4b are connected via the hinge mechanism 4a. The display unit side case 3 and the hinge mechanism 4a are connected via the supporting part 4b. The supporting part 4b and the display unit side case 3 are connected via the rotation mechanism 4c. Thereby, the cellular telephone device 1 connects the operation unit side case 2 and the display unit side case 3 via the hinge mechanism 4a, the supporting part 4b, and the rotation mechanism 4c, and is configured such that the operation unit side case 2 and the display unit side case 3 can be relatively moved and the display unit side case 3 and the supporting part 4b can be relatively moved.

That is, the cellular telephone device 1 can be in: a state where the operation unit side case 2 and the display unit side case 3 are opened and where the longitudinal direction of the operation unit side case 2 and the longitudinal direction of the display unit side case 3 are substantially identical (open state); a state where the operation unit side case 2 and the display unit side case 3 are folded together (closed state); and a state where the longitudinal direction of the display unit side case 3 and the longitudinal direction of the display unit side case 3 cross with each other forming a predetermined angle (for example, substantially 90 degrees) by rotating the display unit side case 3 against the supporting part 4b about a rotation axis Z (cross state).

Here, a closed state is a state where the operation unit side case 2 and the display unit side case 3 face and overlap with each other. An open state is a state where the operation unit side case 2 and the display unit side case 3 do not overlap with each other. A cross state is a state where a relative position of the display unit side case 3 to the supporting part 4b is changed from the open state. Thus, the connecting part 4 connects the operation unit side case 2 and the display unit side case 3 so that the state changes between the open state or the cross state, and the closed state.

In addition, detection of the open state, the closed state, and the cross state can be performed using a hall device and a magnetic part (both of which are not illustrated), for example. Specifically, the hall device and the magnetic part are spaced apart from each other in the open state and the cross state, and arranged so that the hall device and the magnetic part overlap with each other in the thickness direction of the case in the closed state. Since the distances between the hall device and the magnetic part are different among the open state, the closed state, and the cross state at this time, strength of the magnetic force lines radiating from the magnetic part to the hall device is also different. Thus, the hall device detects the open state, the closed state, and the cross state in the cellular telephone device 1 using the strength (magnitude of the magnetic force) of the magnetic force line radiated from the magnetic part.

In addition, as shown in FIG. 2, a side key 2c is formed at the side surface of the operation unit side case 2. The function of the side key 2c will be described later.

Figure 4:
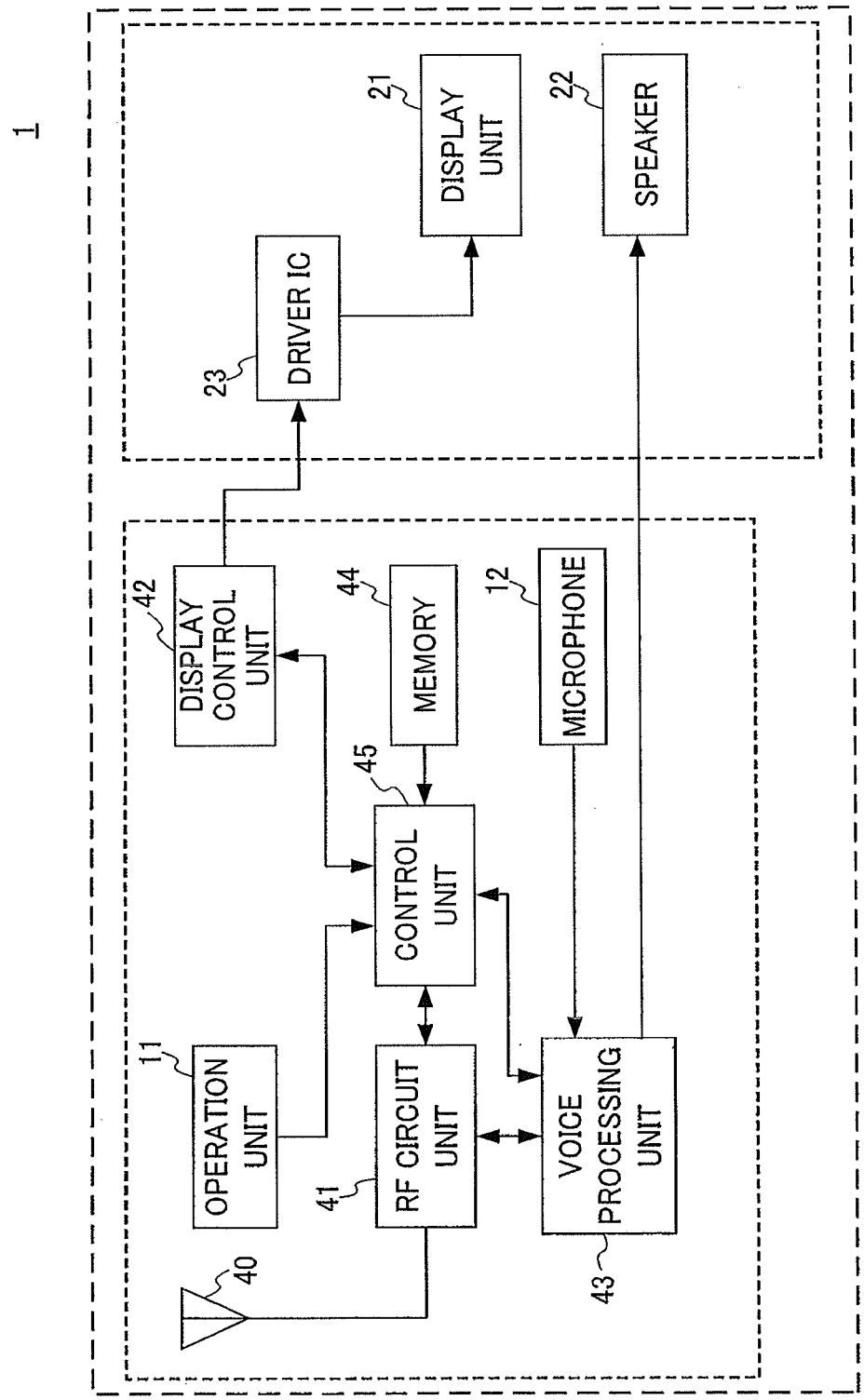
FIG. 4 is a functional block diagram showing the function of the cellular telephone device according to this embodiment.

FIG. 4 is a functional block diagram showing functions of the cellular telephone device 1. In the cellular telephone device 1, as shown in FIG. 2, the operation unit side body 2 includes the operation unit (input unit) 11, the microphone 12, a main antenna 40, an RF circuit unit 41, a display control unit 42, a sound processing unit 43, memory 44, and a control unit 45. In the cellular telephone device 1, the display unit side body 3 includes the display unit 21, the receiver 22, and a driver IC 23.

The main antenna 40 communicates with a base station or the like via a first usable frequency band (for example, 800 MHz), and is configured as a dual band compatible antenna that is compatible with a second usable frequency band (for example, 1.5 GHz) for GPS communication. It should be noted that, although 800 MHz is set as the first usable frequency band in the present embodiment, other frequency bands can also be used. Moreover, the main antenna 40 may communicate with an external device via the first usable frequency band, and another antenna compatible with the second usable frequency band for GPS communication may be separately provided.

The RF circuit unit 41 performs demodulation processing of a signal received via the main antenna 40, and transmits the processed signal to the control unit 45. The RF circuit unit 41 performs modulation processing of the signal transmitted from the control unit 45, and transmits the signal to external devices (base stations) via the main antenna 40. In addition, on the other hand, the RF circuit unit 41 notifies the control unit 45 of the intensity of a signal received via the main antenna 40.

The display control unit 42 performs predetermined image processing according to control by the control unit 45, and outputs the processed image data to the driver IC 23. When the image data is transmitted from the display control unit 42, the driver IC 23 stores the image data in frame memory, and outputs the image data on the display unit 21 at predetermined timing.

The sound processing unit 43 performs predetermined sound processing according to control by the control unit 45 on a signal transmitted from the RF circuit unit 41, and outputs the processed signal to the receiver 22 or a speaker (not shown). The receiver 22 outputs the signal that is transmitted from the sound processing unit 43, to the outside.

Furthermore, when a signal is input from the microphone 12, the sound processing unit 43 processes the signal according to control by the control unit 45, and outputs the processed signal to the RF circuit unit 41. The RF circuit unit 41 performs predetermined processing on the signal transmitted from the sound processing unit 43, and outputs the processed signal to the main antenna 40.

The memory 44 includes, for example, working memory, and is utilized for arithmetic processing by the control unit 45. Moreover, the memory 44 stores a plurality of applications as well as a variety of tables and the like, required by the applications. In addition, the memory 44 may also serve as detachable external memory.

The control unit 45 controls the entirety of the cellular telephone device 1, and is configured to employ a central processing unit (CPU) and the like. Here, a description is provided for control operations of the control unit 45 depending on key operations via the operation unit 11. The control unit 45 changes the characters and functions to be assigned to each key (the function setting operation keys 13, the input operation keys 14 and the selection key 15) configuring the operation unit 11, essentially in accordance with an application that is currently activated.

Figure 5:
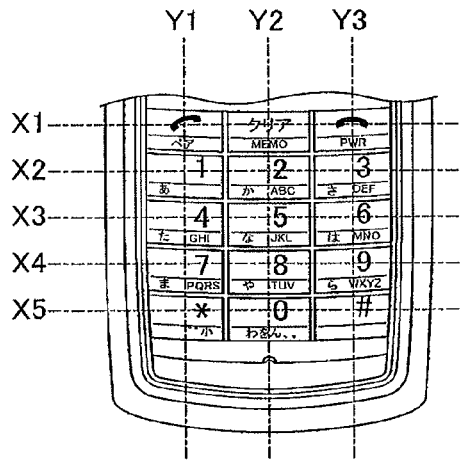
FIG. 5 is a diagram for explaining key assigning in accordance with this embodiment.

More specifically, when any key is depressed, the operation unit 11 transmits position information of the key to the control unit 45 (for example, as shown in FIG. 5(a), in a case of depressing a key in the second line and the left row among the input operation keys 14 (a key with "1" and "a" printed on its surface, position information of (X2, Y2) is transmitted). The control unit 45 accesses the memory 44, refers to a key assignment table corresponding to an application that is currently activated, and executes processing of a character and a function assigned thereto, based on the position information that has been transmitted from the operation unit 11. For example, as shown in FIGS. 5(b) to 5(d), the memory 44 stores a plurality of key assignment tables. It should be noted that FIG. 5(b) is a table that is utilized when an outgoing telephone call is made; FIG. 5(c) is a table that is utilized in a memo pad application and a mail application; and FIG. 5(d) is a table that is utilized when changing a channel, in a television tuner application.

It should be noted that execution of processing of a character means that, for example, in a case in which the currently activated application is a memo pad application, "1" or "a" is displayed on the display unit 21. Furthermore, execution of processing of a function means that, for example, in a case in which the currently activated application is a television tuner application, the display channel is set to channel 1.

Moreover, the memory 44 stores a plurality of key assignment tables. Depending on the application, the control unit 45 switches a key assignment table to be referred to, refers to a predetermined key assignment table based on position information of a key that has been transmitted from the operation unit 11, and performs predetermined processing.

In a cellular telephone device 1 configured as such, there is Application Y, wherein when a key is operated in a communication standby state, each of a plurality of codes (for example, a numeric character and a character) assigned to the operated key are displayed on, for example, separate screen areas, in parallel, and when a predetermined key operation is performed, a screen where one of the codes is displayed is enabled. In addition, Application Y may display one code (for example, character) among the plurality of codes assigned to the operated key when a key is operated in a communication standby state.

In addition, in the cellular telephone device 1, Application Y has a function to display conversion candidates for the character string inputted with the operation unit 11, or prediction candidates that follow the character string. Furthermore, Application Y has a function to execute an application when a character string indicating a name of the application or processing contents of the application is inputted as a result of the conversion candidate or prediction candidate being selected.

Figure 6:
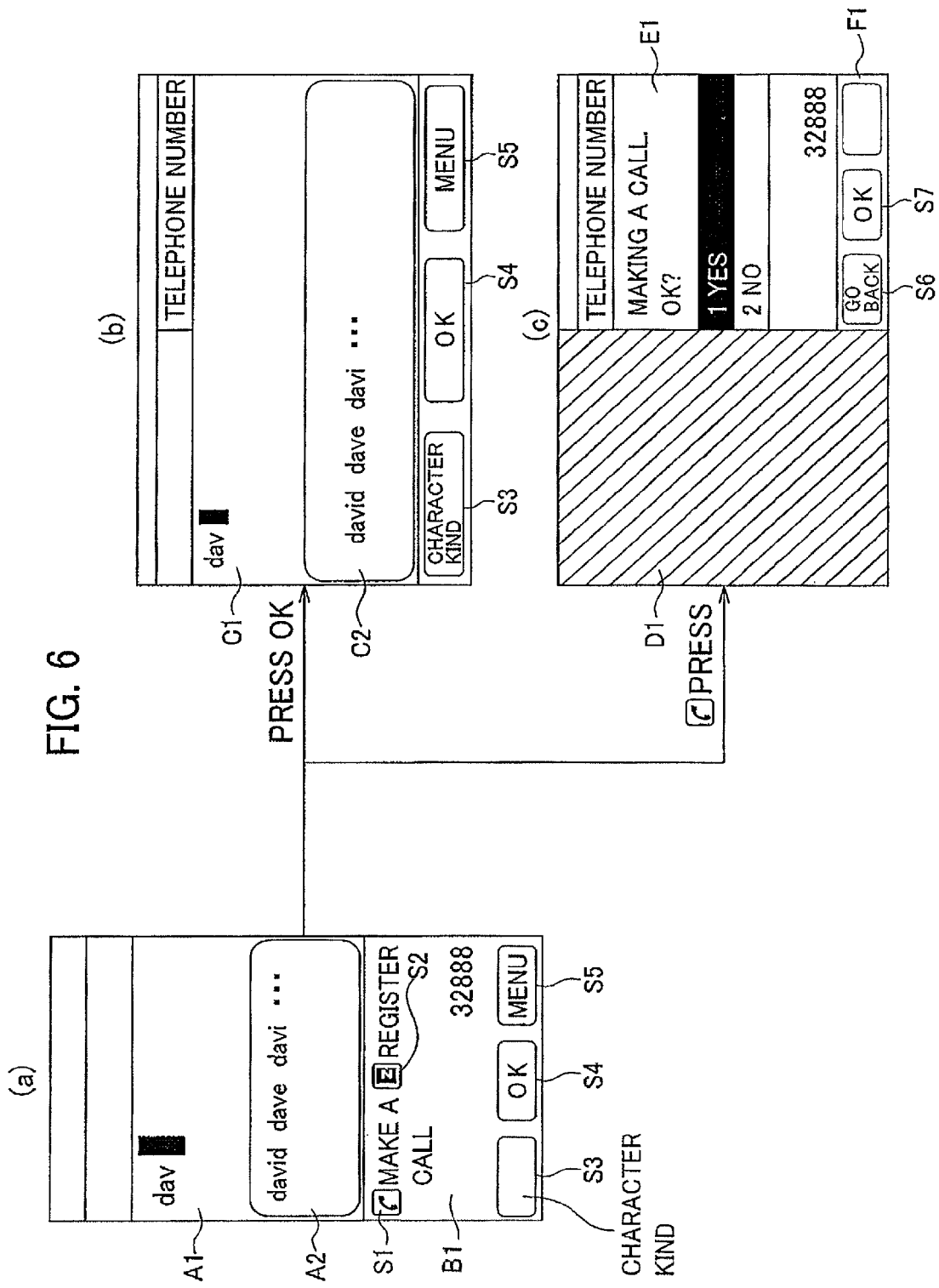
FIG. 6 is a first diagram showing an example of screen transfers displayed on the display screen of the display unit according to this embodiment.
Figure 7:
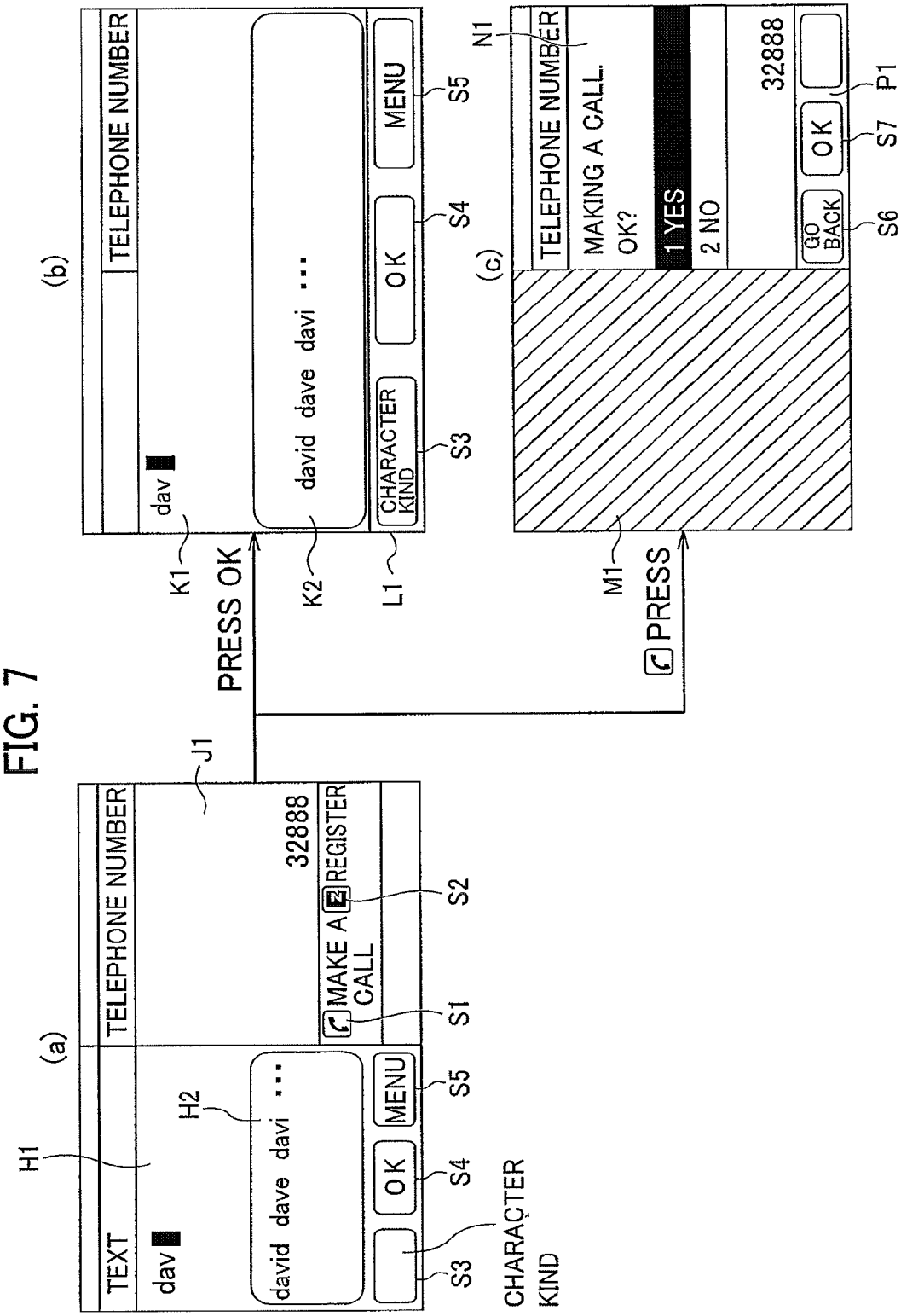
FIG. 7 is a second diagram showing an example of screen transfers displayed on the display screen of the display unit according to this embodiment.

Next, processing by the control unit 45 according to this embodiment will be described with reference to FIG. 6 and FIG. 7. FIG. 6 and FIG. 7 are diagrams showing examples of screen transfers displayed on the display screen of the display unit 21 according to this embodiment.

When one operation key is operated among a plurality of operation keys of the operation unit 11 in a state where the display screen of the display unit 21 is used horizontally, the control unit 45 according to this embodiment displays the first character kind character left aligned on an upper side of the display screen, and displays the second character kind character right aligned on a lower side of the display screen. When a predetermined operation is performed by the operation unit 11, the control unit 45 maintains the display of either one of the characters of the first and the second character kind characters on the display screen, and deletes the other one of the first character kind character and the second character kind character, according to the operated action.

Specifically, as shown in FIG. 6(a), when the plurality of operation keys of the operation unit 11 are operated in the state where the display screen of the display unit 21 is used horizontally, the control unit 45 splits the display screen into upper and lower sides, and displays a alphabetic character assigned to the operation key thus operated ("dav" in this example) in a region A1 on the upper side, and displays a numeric character assigned to the same operation key (numeric characters "32888" in this example) in a region B1 on the lower side, with Application Y.

In addition, the control unit 45 displays a region A2 that is for displaying conversion candidates of the alphabetic character string displayed in the region A1 in the display screen, with Application Y. Furthermore, the control unit 45 displays a plurality of keys S1 and S2 that relate to the functions that use the numeric character string displayed in a region B1 in the display screen, with Application Y. Here, the key S1 is a key for making a call by using the numeric character string displayed in the region B1 with a telephone application, and the key S2 is a key for registering the numeric character string displayed in the region B1 with a directory (phonebook) application.

In addition, the control unit 45 displays in the region B1 in the display screen with Application Y: a soft key S3 for changing the character kind of the character string displayed in the region A1 in the display screen; a soft key S4 for confirming the decision on various operations to the character string displayed in the region A1 in the display screen; and a soft key S5 for displaying various functions for the character string displayed in the region A1 in the display screen. In addition, keys 13a, 15a, and 13b correspond to the soft keys S3, S4 and S5, respectively, and the function corresponding to the display of the respective soft key is executed at the time of the pressing.

Each of the soft keys S3, S4 and S5 is associated with an operation key of the operation unit 11. For example, the soft keys S3 and S5 are associated with the function setting operation keys 13a, 13b among the function key operation keys 13 of the operation unit 11, and the soft key S4 is associated with the determination operation key 15a of the operation unit 11. When the function setting operation key 13a or 13b or the determination operation key 15a is pressed, the function corresponding to the respective display of soft keys S3 and S5 is executed. In addition, when the determination operation key 15a is pressed, the last performed operation is confirmed. It should be noted that, the key S1 is, for example, a key shown in (X1, Y1) in FIG. 5, and key S2 is, for example, one of the function setting operation keys 13 in FIGS. 1 and 3 (for example, a key located at lower right among the four function setting operation keys 13). In addition, a soft key is a key for assigning a function that changes as needed and is displayed in a region imitating a button.

In FIG. 6(a), when an operation that selects the soft key S4 is performed with the determination operation key 15 for displaying the alphabetic character, the control unit 45 deletes the display of the numeric character string "32888" from the region B1 while maintaining the display position of the alphabetic character string "dav" in the region A1, and displays a display related to the hiragana character string on the entire width display screen (a region C1 in FIG. 6(b)), that is, the alphabetic character string "dav", conversion candidates of the hiragana character string, and the soft keys S3, S4 and S5 are displayed (refer to FIG. 6(b)).

Meanwhile, in FIG. 6(a), when an operation for selecting key S2 is performed for making a call, the control unit 45 deletes the display of the alphabetic character string, and displays a display related to the numeric character string, that is, the numeric character string "32888", right aligned in the display screen (refer to FIG. 6(c)).

In particular, as shown in FIG. 6(c), when an operation for selecting key S2 is performed with the determination operation key 15 for making a call, the control unit 45 displays a single color display (for example, blackout and grayout) on the entire display region where the alphabetic character string is displayed (region D1 in FIG. 6(c)) while maintaining the display position (right aligned position) of the numeric character string "32888".

In addition, the control unit 45 displays soft keys S6 and S7 on a lower side of region E1 in the display screen (region F1). Here, the soft key S6 is used for going back to the previous screen, and the soft key S7 is used for confirming various operations to the character string displayed in the region E1 in the display screen. Each of the soft keys S6 and S7 is associated with an operation key of the operation unit 11. For example, the soft key S6 is associated with the function setting operation key 13 of the operation unit 11, and the soft key S7 is associated with the determination operation key 15 of the operation unit 11. When the function setting operation key 13 is pressed, the screen goes back to the previous screen. In addition, when the determination operation key 15 is pressed, the previous operation is confirmed.

Although FIG. 6 describes an example in which the display screen is split into upper and lower sides, the display screen may be split into right and left sides as shown in FIG. 7. That is, as shown in FIG. 7(a), when the plurality of operation keys of the operation unit 11 are operated in the state where the display screen of the display unit 21 is used horizontally, the control unit 45 splits the display screen into right and left sides, and displays the alphabetic character string "dav" assigned to the operation keys, in a region H1 on the left side left aligned, and displays the numeric character string "32888" assigned to the operation keys, in a region J1 on the right side right aligned.

In addition, in the region H1 in the display screen, the control unit 45 displays with application Y: the soft key 3 for changing the character kind of the character string displayed in the region H1 in the display screen; the soft key S4 for confirming various operations to the character string displayed in the region H1 in the display screen; and the soft key S5 for displaying various functions to the character string displayed in the region H1 in the display screen.

In addition, the control unit 45 displays a plurality of keys S1 and S2 that relate to functions that use the numeric character string displayed in the region B1 in the display screen, with Application Y. Here, the key S1 is a key for making a call using the numeric character string displayed in the region J1 with a telephone application, and the key S2 is a key for registering into the directory the numeric character string displayed in the region J1 with a directory application.

In FIG. 7(*a*), when an operation for selecting the soft key S4 is performed with the determination operation key 15 for displaying the alphabetic character string, the control unit 45 deletes the display of the numeric character string "32888" from the region J1 while maintaining the display position of the character string of the alphabetic character string "dav" in the region H1 to perform the display related to the alphabetic character string on the entire width display screen (region K1 in FIG. 7(*b*)), that is, the alphabetic character string "dav", the conversion candidates of the alphabetic character string, and the soft keys S3, S4 and S5 are displayed(refer to FIG. 7(*b*)).

Meanwhile, as shown in FIG. 7(*a*), when an operation that selects key S2 is performed with the determination operation key 15 for making a call, the control unit 45 deletes the display of the alphabetic character string, and displays the display related to the numeric character string, that is, the display of the numeric character string "32888", in the display screen right aligned (refer to FIG. 7(*c*)).

In particular, as shown in FIG. 7(*c*), when an operation for selecting key S2 is performed with the determination operation key 15 for making a call, the control unit 45 displays a single color display (for example, blackout and grayout) at the entire display region where the alphabetic character string is displayed (region M1 in FIG. 7(*c*)) while maintaining the display position of the numeric character string "32888" in the display screen. In addition, the control unit 45 displays the soft keys S6 and S7 on a lower side of region N1 in the display screen (region P1).

In addition, after maintaining the display position of one of the alphabetic character string or the numeric character string and deleting the display of the other one of the alphabetic character string or the numeric character string in the display screen in FIG. 6(*b*) and (*c*) or FIG. 7(*b*) and (*c*), when an operation to delete a part of the character string of either the alphabetic character string or the numeric character string is performed by the operation unit 11, the control unit 45 may delete a part of the character string of either the alphabetic character string or the numeric character string and display both the alphabetic character string and the numeric character string that are not deleted on the display screen.

Specifically, when an operation to delete a character "v" in the alphabetic character string "dav" or a numeric characters "888" is performed with operation unit 11 in FIG. 6(*b*) or FIG. 6(*c*), the control unit 45 deletes the alphabetic character "v" and the numeric characters "888", and splits the display screen into upper and lower sides, and displays the alphabetic character string "dav" left aligned on the upper side in the display screen, and displays the numeric character string "32" right aligned on the lower side in the display screen.

Alternatively, when an operation to delete a character "v" among the alphabetic character string "dav" or the numeric character "5" is performed with the operation unit 11 in FIG. 7(*b*) or FIG. 7(*c*), the control unit 45 deletes the alphabetic character "v" and the numeric character "888", and splits the display screen into right and left sides, and displays the alphabetic character string "da" left aligned on the left side in the display screen and displays the numeric character string "32" right aligned on the right side in the display screen.

Figure 8:
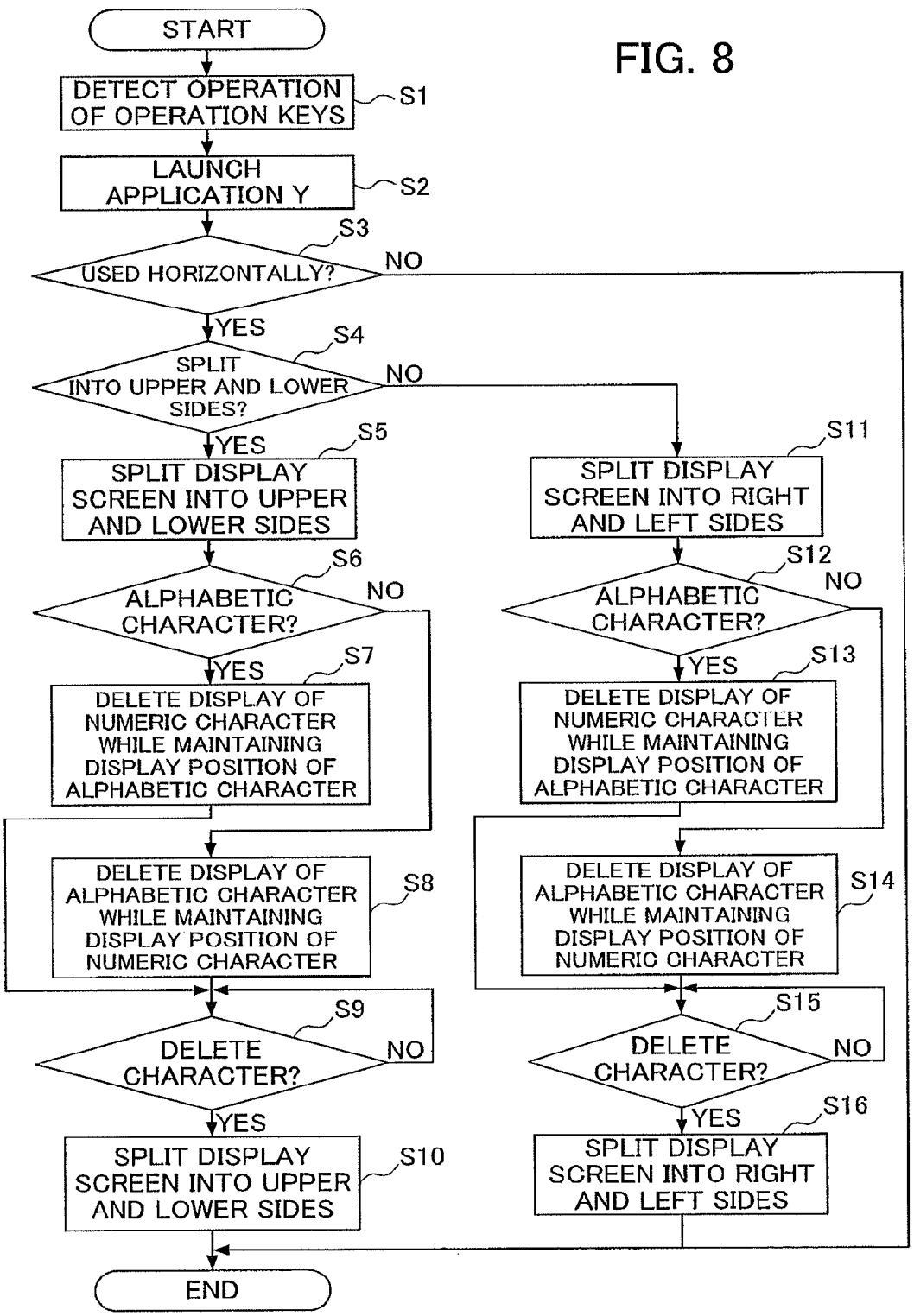
FIG. 8 is a flow chart showing internal processing of the control unit according to this embodiment.

FIG. 8 is a flow chart showing internal processing of the control unit 45 according to this embodiment. In Step S1, the control unit 45 detects that one operation key is operated in a standby screen among a plurality of operation keys in the operation unit 11. It should be noted that the standby screen is also referred to as wallpaper, and is a screen that awaits making and reception of a call and launching of an application. In Step S2, the control unit 45 launches Application Y described above.

In Step S3, the control unit 45 determines whether or not the mobile telephone 1 is in an open state or a cross state, that is, whether or not the display screen of the display unit 21 is used vertically or horizontally. If the display screen is used horizontally (YES), the process proceeds to Step S4. If the display screen is used vertically (NO), the process ends.

In Step S4, the control unit 45 determines whether or not the setting is performed so that the display screen is split into upper and lower sides. If the setting is performed to split the display screen into upper and lower sides (YES), the process proceeds to Step S5. If the setting is performed to split the display screen into right and left sides (NO), the process proceeds to Step S11.

In Step S5, the control unit 45 splits the display screen into upper and lower sides, and displays the alphabetic character string assigned to the operation key in the region A1 on the upper side and displays the numeric character string assigned to the operation key in the region B1 on a lower side with Application Y (refer to FIG. 6(*a*)).

In Step S6, the control unit 45 determines whether an operation for selecting the display of the alphabetic character string or the numeric character string is performed. If an operation for selecting the display of the alphabetic character string is done (YES), the process proceeds to Step S7. If an operation for displaying the numeric character string is done (NO), the process proceeds to Step S8.

In Step S7, the control unit 45 deletes the display of the numeric character string from the region B1, and displays the display related to the alphabetic character string on the entire width display screen (region C1 in FIG. 6(*b*)) while maintaining the display position (left aligned position) of the alphabetic character string in the region A1 (refer to FIG. 6(*b*)).

In Step S8, the control unit 45 displays a single color display (for example, blackout and grayout) in the entire display region where the alphabetic character string is displayed (region E1 in FIG. 6(*c*)), while maintaining the display position (right aligned position) of the numeric character string on the display screen (refer to FIG. 6(*c*)).

In Step S9, the control unit 45 determines whether or not an operation to delete a part of the character of either alphabetic character or numeric character is performed with the operation unit 11. If the operation to delete is performed (YES), the process proceeds to Step S10. If the operation to delete is not performed (NO), the process in Step S9 is repeated again.

In step S10, when there is an operation to cancel an input (for example, cancellation of an operation to delete a part of a character string and cancellation of a soft key operation) immediately after either the alphabetic character string or the numeric character string is displayed, the control unit 45 splits the display screen into upper and lower sides and returns the state to a state where both the alphabetic character string and the numeric character string are displayed. At this time, if the trigger of the return is a deletion operation, both the alphabetic character string and the numeric character string may be displayed in a state where one character at the end is deleted.

In Step S11, the control unit 45 splits the display screen into right and left sides, and displays the alphabetic character string assigned to the operation key in the region H1 on the left part and displays the numeric character string assigned to the operation keys in the region J1 on the right part (refer to FIG. 7(*a*)).

In Step S12, the control unit 45 determines whether an operation for selecting the display of the alphabetic character string or the numeric character string is performed. If the operation for selecting the display of the alphabetic character string is performed (YES), the process proceeds to Step S13. If an operation for displaying the numeric character string is performed (NO), the process proceeds to Step S14.

In Step S13, the control unit 45 displays the display relating to the alphabetic character string on the entire width display screen (region K1 in FIG. 7(*b*)) by deleting the display of the numeric character string from the region J1 while maintaining the display position (left aligned position) of the alphabetic character string in region H1 (refer to FIG. 7(*b*)).

In Step S14, the control unit 45 displays a single color display (for example, blackout and grayout) in the entire display region where the alphabetic character string is displayed (region M1 in FIG. 7(*c*)) while maintaining the display position (right aligned position) of the numeric character string on the display screen (refer to FIG. 7(*c*)).

In Step S15, the control unit 45 determines whether or not an operation to delete a part of a character string of either the alphabetic character string or the numeric character string is performed with the operation unit 11. If the operation to delete is performed (YES), the process proceeds to Step S16. If the operation to delete is not performed (NO), processing in Step S15 is repeated again.

In Step S16, when there is an operation to cancel an input (for example, an operation to delete a part of a character string, and cancellation of a soft key operation) immediately after only either one of the alphabetic character string and the numeric character string is displayed, the control unit 45 splits the display screen into right and left sides and returns the state to a state where both the alphabetic character string and the numeric character string are displayed. At this time, if the trigger of the return is a deletion operation, both the alphabetic character string and the numeric character string may be displayed with one character at the end deleted.

As described above, in accordance with this embodiment, in a state where the display screen of the display unit 21 is used horizontally, the control unit 45 displays the first character kind character left aligned on the upper side in the display screen, and displays the second character kind character right aligned on a lower side in the display screen.

Moreover, when a predetermined operation is performed by the operation unit 11, the control unit 45 maintains the display position of either one of the first character kind character and the second character kind character on the display screen according to the operated action, and deletes the display of the other one of the first character kind character and the second character kind character. Accordingly, since the mobile telephone 1 displays either one of the first character kind character and the second character kind character, the user sees only either one of the first character kind character and the second character kind character. Therefore, the mobile telephone 1 can shorten a view point movement distance of the user.

In addition, when an operation to adopt the display of the second character kind character is performed as the predetermined operation with the operation unit 11, the control unit 45 deletes the display of the first character kind character, and displays the second character kind character right aligned while maintaining the display position of the second character kind character on the display screen. Accordingly, since the mobile telephone 1 displays the second character kind character and the display related to the second character kind character right aligned, a view point movement distance of the user can be shortened.

In addition, when an operation to display the second character kind character is performed with the operation unit 11, the control unit 45 displays a single color display in the entire display region where the first character kind character is displayed while maintaining the character display position of the second character kind character on the display screen. Accordingly, the mobile telephone 1 can show clearly to the user that the first character kind character is not displayed.

In addition, the control unit 45 splits the display screen into right and left sides, and displays the first character kind character left aligned on an upper part of the split left side display screen, and displays the second character kind character right aligned on a lower part of the split right side display screen. Alternatively, the control unit 45 splits the display screen into upper and lower sides, and displays the first character kind character left aligned on an upper part of the split upper side display screen, and displays the second character kind character on a lower part of the split lower side display screen. Accordingly, the mobile telephone 1 can display both the first character kind character and second character kind character as appropriate.

In addition, when a key for making a call is operated as the predetermined operation, the control unit 45 deletes the display of the first character kind character while maintaining the display position of the second character kind character on the display screen. Accordingly, the mobile telephone 1 can perform call making processing as appropriate.

In addition, when an operation to delete either one of the first character kind character and the second character kind character where the display is continued is performed with the operation unit 11, the control unit 45 returns the state to a state where both the first character kind character and the second character kind character are displayed on the display screen. Accordingly, since the mobile telephone 1 returns the state to a state where both the first character kind character and the second character kind character are displayed again when a part of the character string of either the first character kind character or the second character kind character is deleted, the user does not need to input the first character kind character and the second character kind character again, and thus the operability of the mobile telephone 1 improves.

Although the embodiment of the present invention has been described above, the present invention is not limited to the above embodiment and may be modified as appropriate. For example, although a mobile telephone 1 having a plurality of physical operation keys has been described in the above embodiment, the present invention is not limited to this, and the present invention may be implemented on a mobile telephone that adopts a touch panel in the display unit 21 and has virtual keys, for example.

It should be noted that, although the above embodiment has been shown using an example that distinguishes whether the state is a state where the display screen is used vertically or a state where the display screen is used horizontally by detecting a change in the relative position of the display unit side case 3 to the supporting part 4b in an open state, in which the operation unit side case 2 and the display unit side case 3 are connected, the present invention is not limited thereto. For example, in a case of a straight type terminal having a single non-interconnected case and a touch panel, whether the state is a state where the display screen is used vertically or a state where the display screen is used horizontally may be distinguished by installing an additional acceleration sensor or the like in the case and detecting the inclination state of the terminal. It should be noted that, in this case, the operation unit may be an operation unit having a plurality of operation keys where virtual operation keys that detect contacts to the operation keys are displayed in the touch panel, instead of a key switch that needs a physical pressing stroke.

In addition, although a cellular telephone device 1 that serves as a mobile electronic device has been described in the above embodiment, the present invention is applicable to other mobile electronic devices. For example, the mobile electronic device of the present invention may be a digital camera, a PHS (registered trademark; Personal Handy phone System) device, a PDA (Personal Digital Assistant), a portable navigation device, a personal computer, a notebook PC, a portable game device, or the like.

Figure 9:
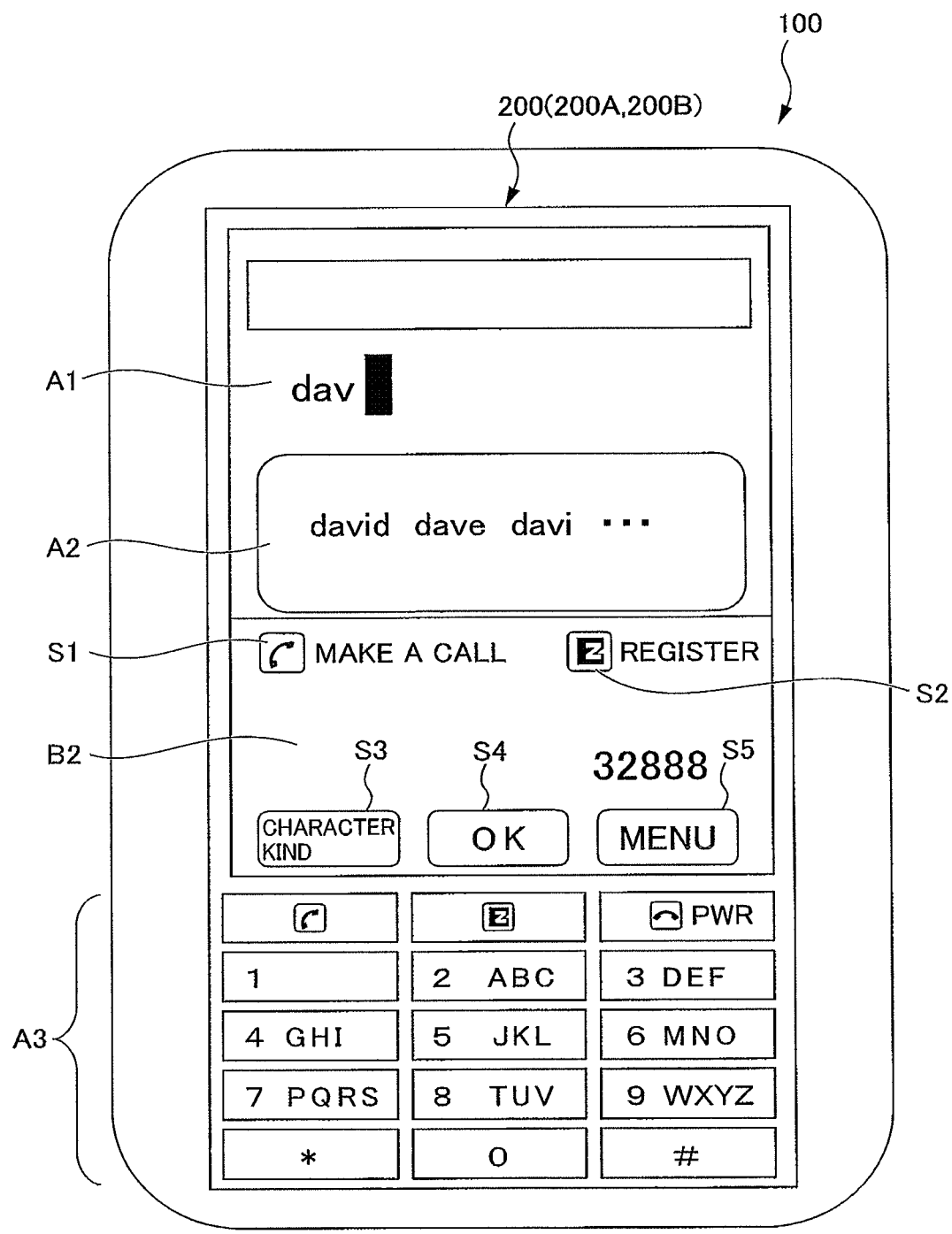
FIG. 9 is a first diagram showing an example of screen transfers displayed on the tablet device according to this embodiment.

It should be noted that the present invention can also be implemented in a tablet device 100 other than the mobile electronic device 1 including the operation unit side case 2 and the display unit side case 3. FIG. 9 is a front view of the tablet device 100 when used in a portrait mode.

The tablet device 100 includes a touch screen display 200. The touch screen display 200 has a display 200A and a touch screen 200B. The display 200A includes a display device such as an LCD (Liquid Crystal Display), an OELD (Organic Electro-Luminescence Display) or an IELD (Inorganic Electro-Luminescence Display). The display 200A displays characters, images, symbols, graphics and the like.

The touch screen 200B detects a touch of a finger, a pen, a stylus pen or the like to the touch screen 200B. The touch screen 200B detects a position where at least the finger, the pen, the stylus pen or the like touches the touch screen 200B. The touch screen 200B may use a detection method of any type such as a capacitive type, a resistive type, a surface acoustic wave type (or an ultrasonic wave type), an infrared type, an electromagnetic induction type, and a load detection type.

In a case in which the present invention is implemented in the tablet device 100, the present invention shown in FIG. 6(*a*) of the aforementioned embodiment is implemented as shown in FIG. 9. In other words, a configuration corresponding to the operation unit 11 in the aforementioned embodiment is displayed in Region A3 of the touch screen display 200, and the operation unit thus displayed is operated by the user.

Figure 10:
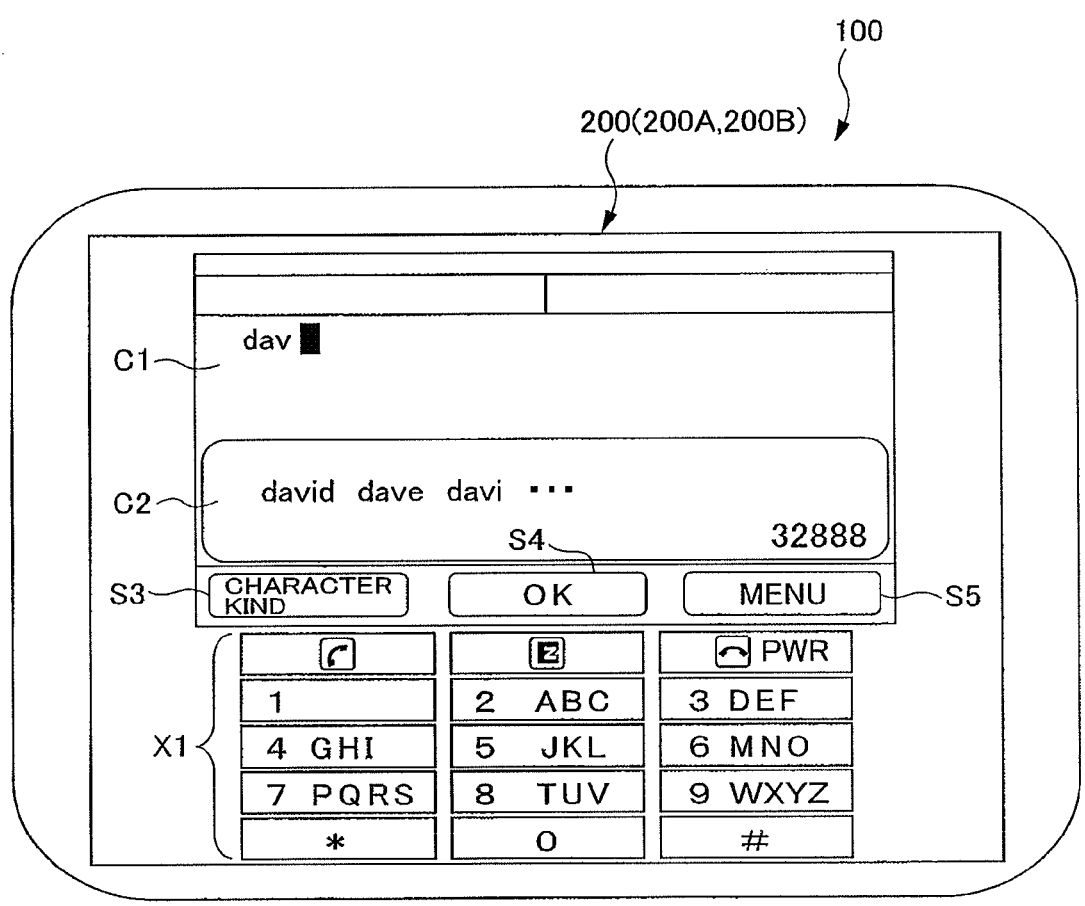
FIG. 10 is a second diagram showing an example of screen transfers displayed on the tablet device according to this embodiment.
Figure 11:
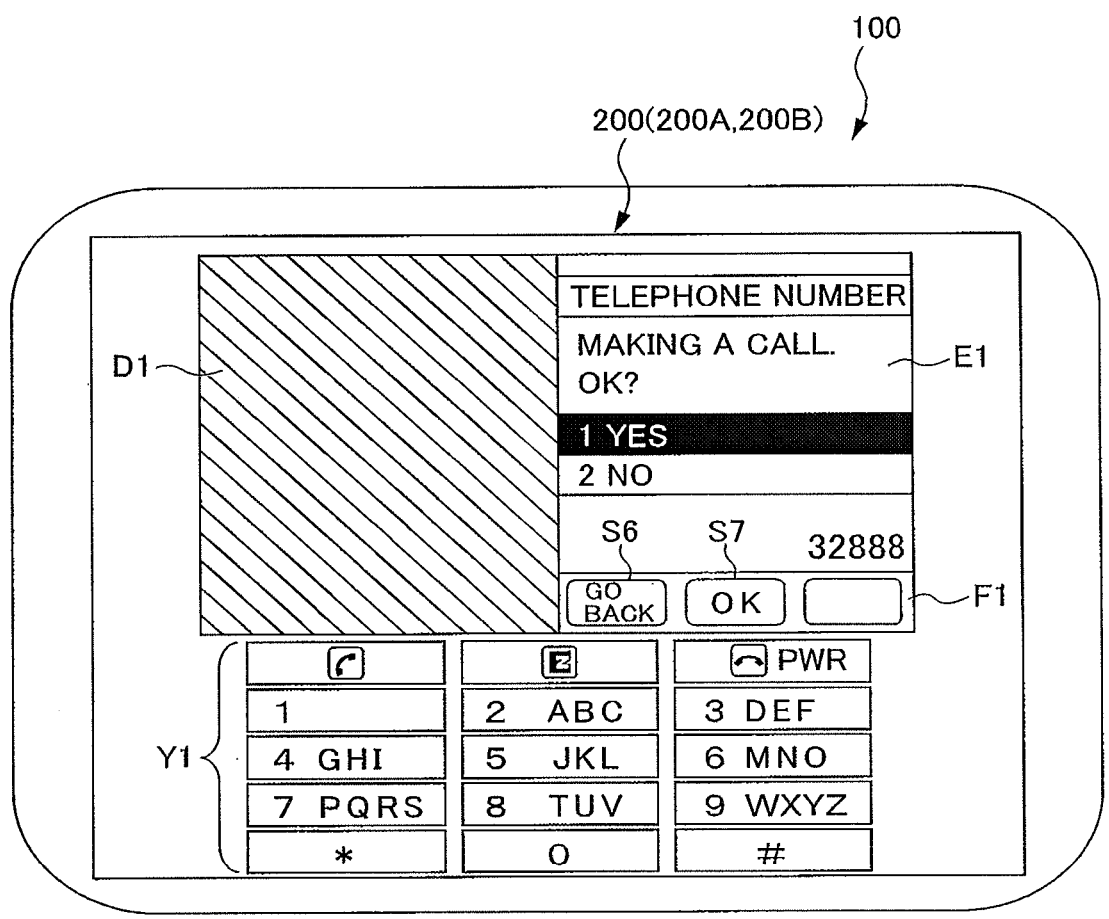
FIG. 11 is a third diagram showing an example of screen transfers displayed on the tablet device according to this embodiment.
Figure 12:
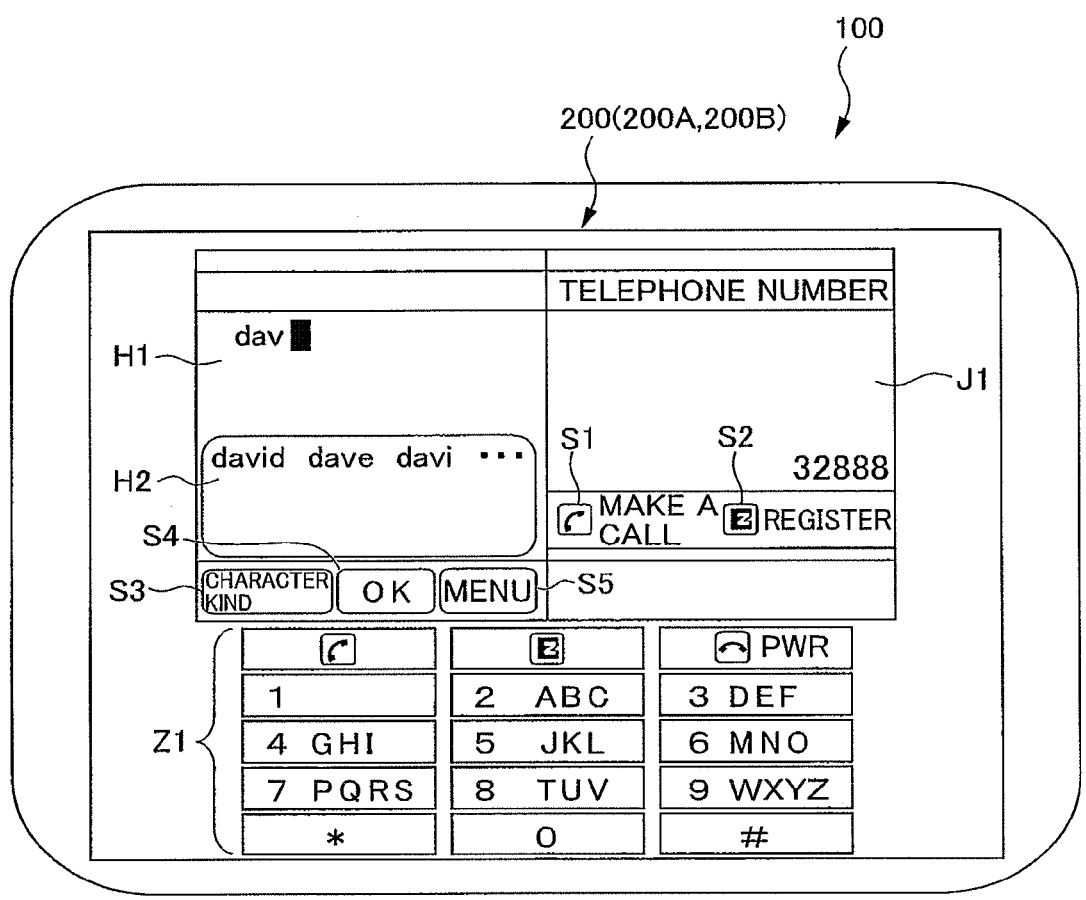
FIG. 12 is a fourth diagram showing an example of screen transfers displayed on the tablet device according to this embodiment.
Figure 13:
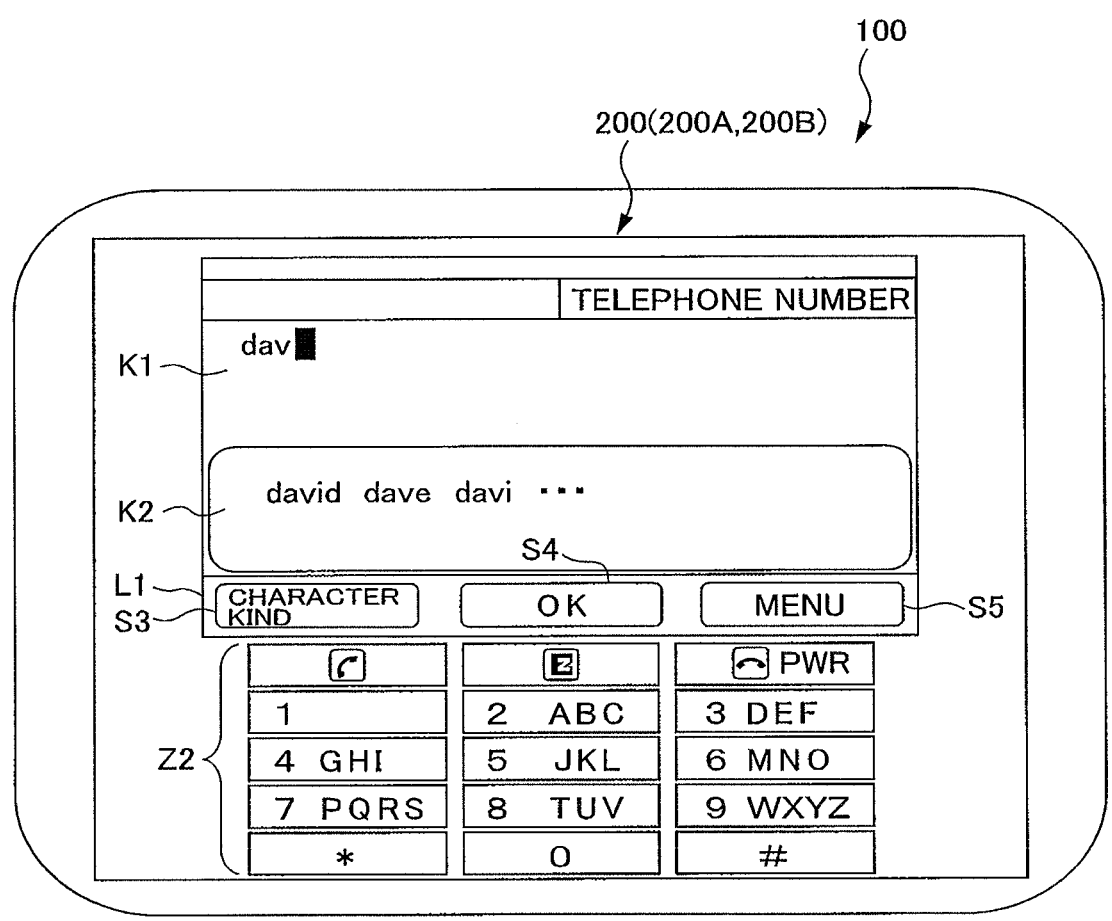
FIG. 13 is a fifth diagram showing an example of screen transfers displayed on the tablet device according to this embodiment.
Figure 14:
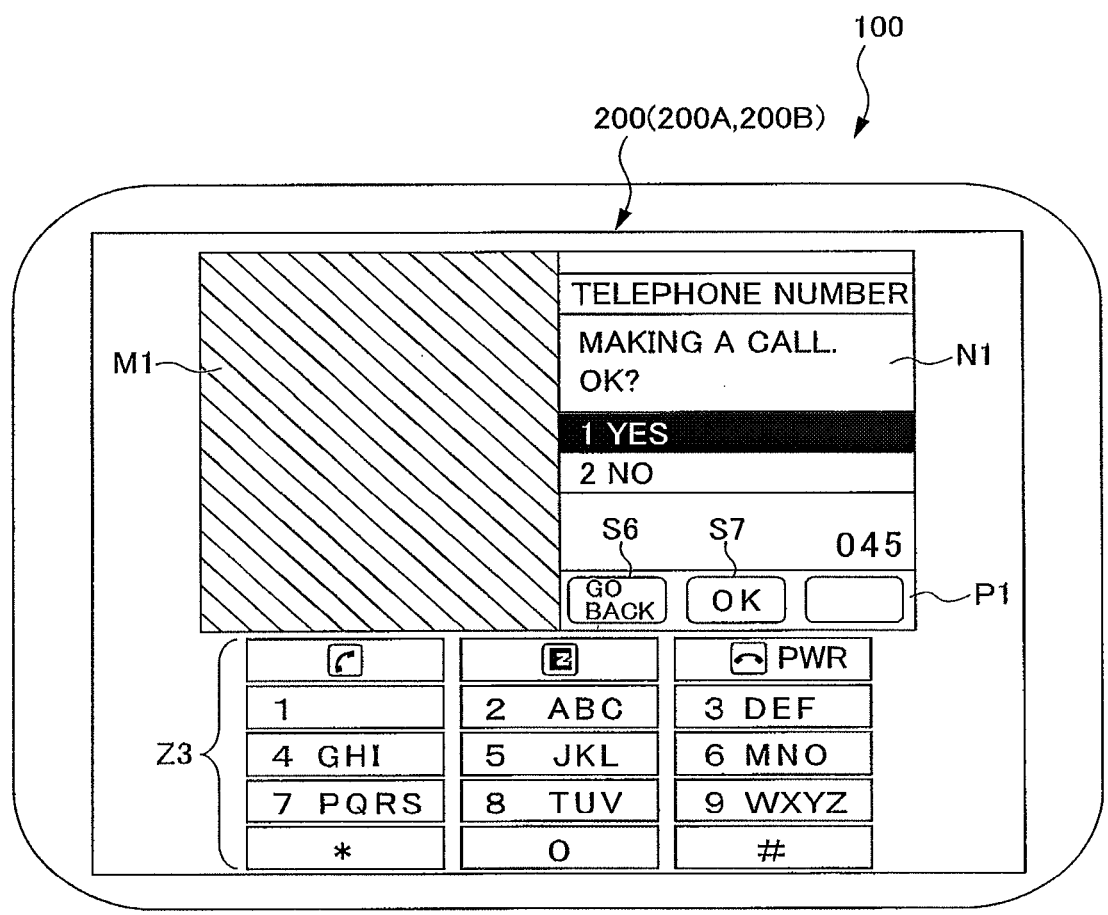
FIG. 14 is a sixth diagram showing an example of screen transfers displayed on the tablet device according to this embodiment.

Similarly, in a case in which the present invention is implemented in the tablet device 100, the present invention shown in FIG. 6(*b*) of the aforementioned embodiment is implemented as shown in FIG. 10. In other words, a configuration corresponding to the operation unit 11 in the aforementioned embodiment is displayed in Region X1 of the touch screen display 200, and the operation unit thus displayed is operated by the user. Similarly, in a case in which the present invention is implemented in the tablet device 100, the present invention shown in FIG. 6(*c*) of the aforementioned embodiment is implemented as shown in FIG. 11. In other words, a configuration corresponding to the operation unit 11 in the aforementioned embodiment is displayed in Region Y1 of the touch screen display 200, and the operation unit thus displayed is operated by the user. Similarly, in a case in which the present invention is implemented in the tablet device 100, the present invention shown in FIG. 7(*a*) of the aforementioned embodiment is implemented as shown in FIG. 12. In other words, a configuration corresponding to the operation unit 11 in the aforementioned embodiment is displayed in Region Z1 of the touch screen display 200, and the operation unit thus displayed is operated by the user. Similarly, in a case in which the present invention is implemented in the tablet device 100, the present invention shown in FIG. 7(*b*) of the aforementioned embodiment is implemented as shown in FIG. 13. In other words, a configuration corresponding to the operation unit 11 in the aforementioned embodiment is displayed in Region Z2 of the touch screen display 200, and the operation unit thus displayed is operated by the user. Similarly, in a case in which the present invention is implemented in the tablet device 100, the present invention shown in FIG. 7(*c*) of the aforementioned embodiment is implemented as shown in FIG. 14. In other words, a configuration corresponding to the operation unit 11 in the aforementioned embodiment is displayed in Region Z3 of the touch screen display 200, and the operation unit thus displayed is operated by the user.

What is claimed is:

1. A mobile electronic device, comprising:
    a display unit having a display screen;
    an operation key, wherein at least a first character kind character and a second character kind character are assigned to the operation key; and
    a processor,
    wherein
    in response to an operation of the operation key, the processor is configured to
        start displaying the first character kind character assigned to the operated operation key in a first screen of the display screen, and
        start displaying the second character kind character assigned to the operated operation key in a second screen of the display screen, wherein the second screen differs from the first screen,
    in response to a first operation related to functions using the displayed first character kind character, the processor is configured to
        delete the second screen, and
        display a new screen related to the displayed first character kind character, in the display screen, and
    in response to a second operation related to functions using the displayed second character kind character, the processor is configured to
        delete the first screen, and
        continue to display the second screen, while maintaining a location of the second screen in the display screen.

2. The mobile electronic device according to claim 1, wherein,
in a state where the display screen is positioned in a landscape orientation, the processor is configured to display
the first character kind character, input by the operated operation key, left aligned on an upper side of the display screen,
the second character kind character, input by the operated operation key, right aligned on a lower side of the display screen,
a plurality of function keys related to the functions associated with the first and second character kind characters, and
candidate characters associated with the first character kind character in a conversion region of the first screen.

3. The mobile electronic device according to claim 1, wherein, in response to the second operation, the processor is further configured to display a single color display in an entire display region where the first screen was displayed.

4. The mobile electronic device according to claim 1, wherein, in response to the first operation, the processor is configured to
display the new screen related to the displayed first character kind character on an entire width of the display screen while maintaining a display position of the first character kind character on the display screen.

5. The mobile electronic device according to claim 1, wherein the processor is configured to
split the display screen into right and left sides corresponding the first and second screens, respectively.

6. The mobile electronic device according to claim 1, wherein the processor is configured to
split the display screen into upper and lower sides corresponding the first and second screens, respectively.

7. The mobile electronic device according to claim 1, wherein
the operation key includes a call making key for making a call, and
in response to the call making key being operated as the second operation, the processor is configured to
delete the first screen and continue to display the second screen while maintaining the location of the second screen in display screen.

8. The mobile electronic device according to claim 1, wherein,
after the first screen is deleted while displaying the second screen and maintaining the location of the second screen in the display screen, and
when an operation to delete a part of the first or second character kind character is performed by the operation key,
the processor is configured to start displaying the first and second screens, and display a remainder of the first character kind character in the first screen and a remainder of the second character kind character in the second screen.

9. The mobile electronic device according to claim 1, further comprising:
a first case having the display unit;
a second case having the operation key; and
a connecting part which connects the first case and the second case and is configured to transfer the display screen between
a state where the display screen is positioned in a portrait orientation relative to the second case and
the state where the display screen is positioned in a landscape orientation relative to the second case.

10. The mobile electronic device according to claim 1, further comprising:
a case having a touch panel defining both the display unit and the operation key;
wherein the processor is configured to distinguish between a state where the display screen is positioned in a portrait orientation and the state where the display screen is positioned in a landscape orientation, by detecting an inclination state of the case.

11. The mobile electronic device according to claim 1, wherein
one of the first character kind character and the second character kind character is a numeric character, and
the other of first character kind character and second character kind character is an alphabetic character.

12. The mobile electronic device according to claim 1, wherein, in response to the second operation related to the functions using the displayed second character kind character, the processor is configured to
delete the first screen, and
continue to display the second screen, while maintaining the location and a size of the second screen in the display screen.

13. A character input method in a mobile electronic device including a display unit having a display screen, an operation key, and a processor, wherein at least a first character kind character and a second character kind character are assigned to the operation key the method comprising:
in response to an operation of the operation key,
starting displaying the first character kind character assigned to the operated operation key in a first screen of the display screen, and
starting displaying the second character kind character assigned to the operated operation key in a second screen of the display screen, wherein the second screen differs from the first screen,
in response to a first operation related to functions using the displayed first character kind character is performed,
deleting the second screen, and
displaying a new screen related to the displayed first character kind character, in the display screen, and
in response to a second operation related to functions using the displayed second character kind character,
deleting the first screen, and
continuing to display the second screen, while maintaining a location of the second screen in the display screen.

* * * * *